Figure 4:
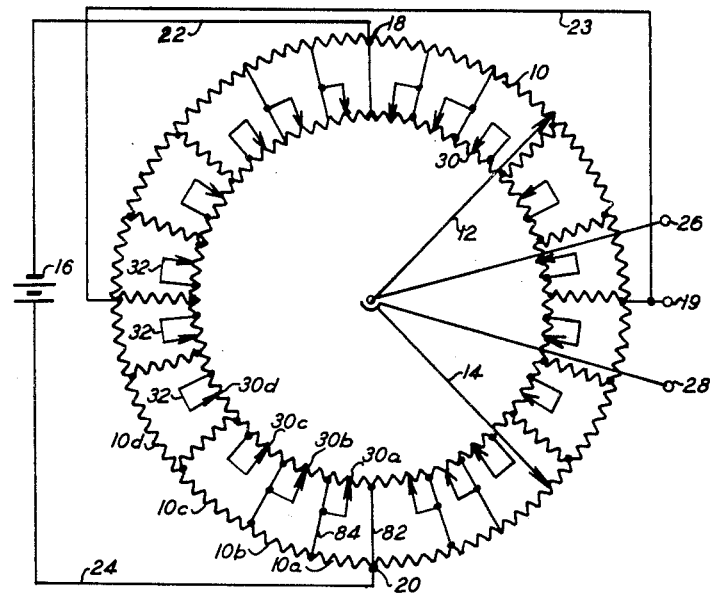

March 12, 1957  M. P. MATTHEW  2,785,260
VARIABLE FUNCTION FILM VOLTAGE DIVIDER
Filed April 13, 1955  3 Sheets—Sheet 1
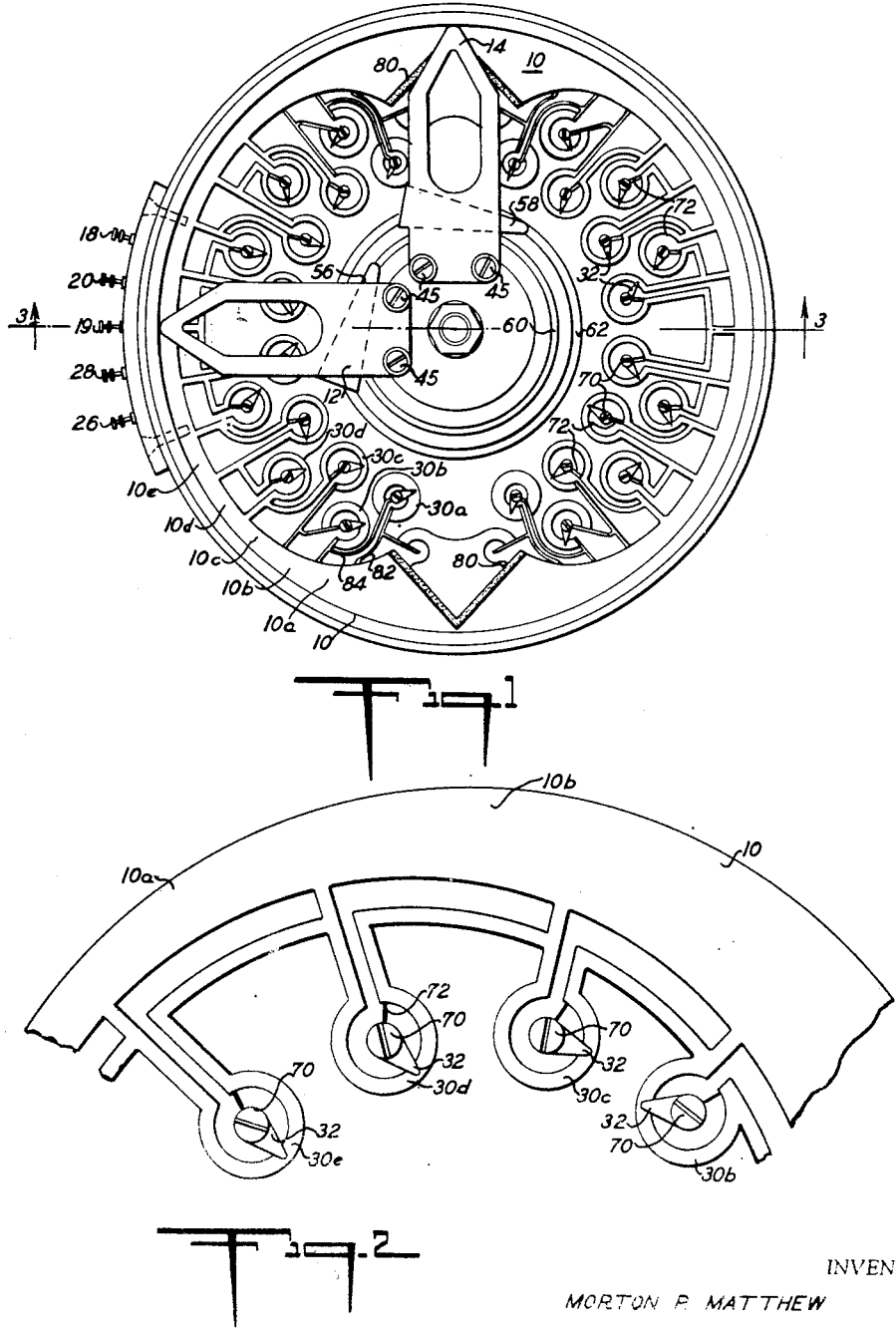
INVENTOR
MORTON P. MATTHEW
BY Fisher & Christen
ATTORNEY March 12, 1957     M. P. MATTHEW     2,785,260
VARIABLE FUNCTION FILM VOLTAGE DIVIDER
Filed April 13, 1955     3 Sheets-Sheet 2
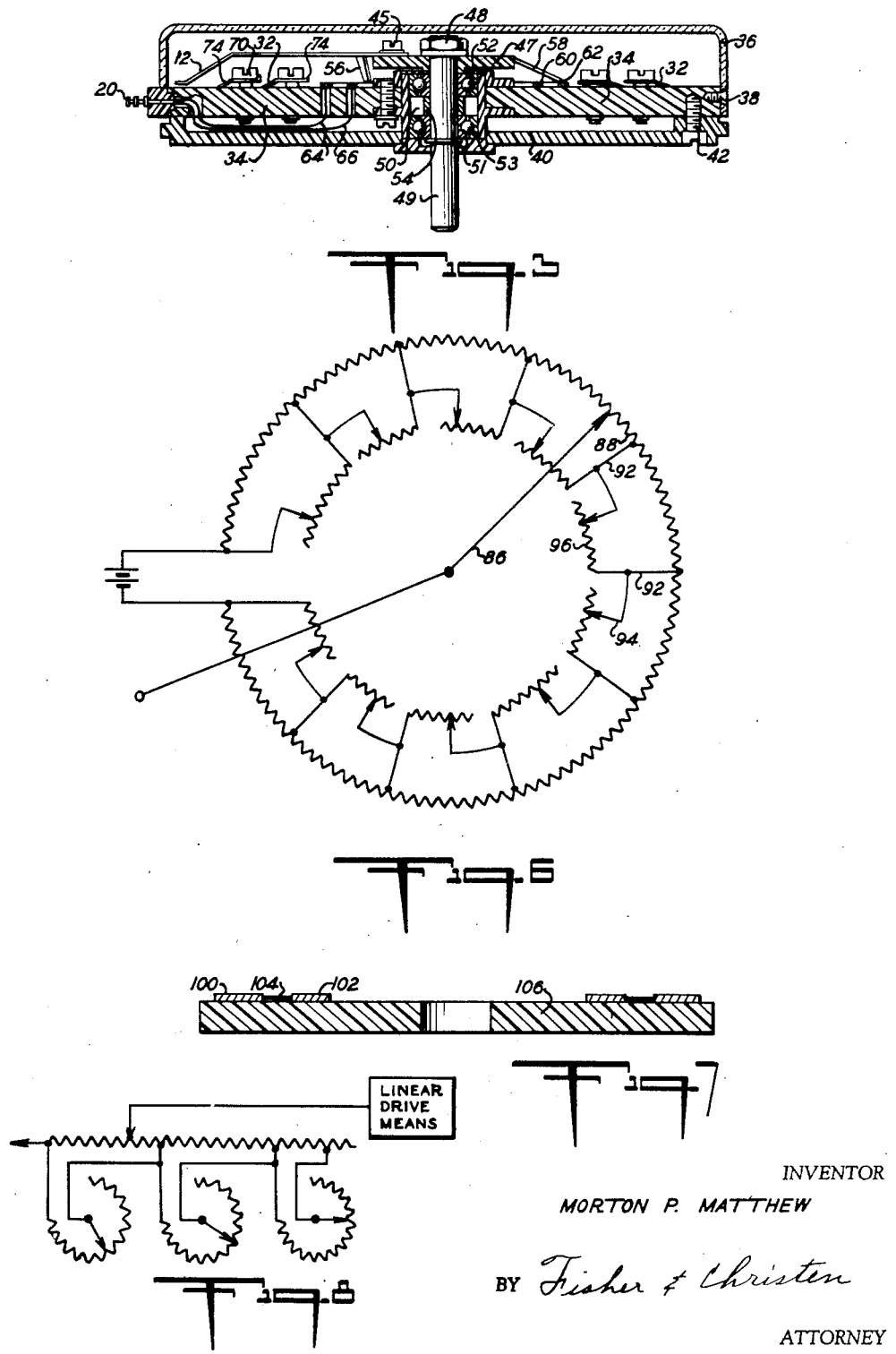
INVENTOR
MORTON P. MATTHEW
BY Fisher & Christen
ATTORNEY March 12, 1957     M. P. MATTHEW     2,785,260
VARIABLE FUNCTION FILM VOLTAGE DIVIDER Filed April 13, 1955     3 Sheets-Sheet 3

INVENTOR
MORTON P. MATTHEW

BY *Fisher & Christen*

ATTORNEY

United States Patent Office 2,785,260
Patented Mar. 12, 1957

2,785,260

VARIABLE FUNCTION FILM VOLTAGE DIVIDER

Morton P. Matthew, Takoma Park, Md., assignor to The Ahrendt Instrument Company, Incorporated Application April 13, 1955, Serial No. 501,012

8 Claims. (Cl. 201—48)

This invention relates to a voltage divider and more particularly to a voltage divider or potentiometer in which the resistance elements are constructed from a thin film of resistance material deposited upon a base of insulating material, the invention being applicable to non-linear function potentiometers as well as to linear function potentiometers.

It is most important in precision potentiometers that the resistance of the device over its operating range correspond to the desired variable function within a very small tolerance. As a practical matter, in potentiometers using a thin resistance film, a high degree of accuracy is difficult to obtain, and certainly in a mass production device, it is not possible for each potentiometer to be identical to every other potentiometer manufactured. The principal difficulty arises in the process of depositing the resistance film on the base material, wherein various methods, such as dipping, spraying, evaporating and the like may be used, the shape or outline of the film being controlled by masking or machining. Although different functions may require different film shapes, in every case the accuracy obtainable in conforming to the true function desired is always subject to the limitations of the depositing and shaping processes, and a precision potentiometer is therefore difficult to produce.

The potentiometer according to the present invention avoids many of the disadvantages of the prior devices by providing means for adjustably controlling the incremental resistance values of the voltage dividing resistance at several places along its length, whereby the voltage characteristic can be trimmed to the desired tolerance. According to the basic concept of the invention, the means for adjusting the incremental resistances comprises a secondary resistance connected in parallel to the main or primary resistance at a number of discrete junction points, so that there are a plurality of variable secondary segments in parallel with an equal number of fixed primary segments along the length of the primary voltage dividing resistance, and a corresponding plurality of adjustable short-circuting members which may be used to selectively vary the resistance value of any segment of the secondary resistance. By proper adjustment of the short-circuiting members, the resistance characteristic of the potentionmeter may be varied to conform to the desired variable function.

In the preferred form of the invention, the main or primary resistor is a resistance disposed around the circumference of an insulating disc and the secondary resistance comprises a film which is deposited in a thin strip in the form of a series of interconnected small circles, located inside the circle defined by the primary resistor each junction between adjacent circles being connected to the main resistance film. A wiping contact is associated with each small circle and constitutes a short-circuiting element for shortening out the desired amount of resistance in each segment.

It is therefore an object of this invention to provide a variable function potentiometer which includes a primary resistor consisting of a thin film of resistance material deposited upon an insulating base and in which the resistance of the primary resistor can be varied at a plurality of discrete locations along its length.

It is another object of the invention to provide a resistance film potentiometer having a primary resistance and a secondary resistance shunted at various discrete locations across the primary resistance, the resistance of the secondary shunting being selectively variable whereby the effective resistance of the potentiometer may be selectively trimmed along its length to conform to a desired function.

It is still a further object of the invention to provide a potentiometer as described above in which the secondary resistance is variable through the use of a plurality of wiping contacts respectively associated with the shunting segments thereof.

Figure 5:
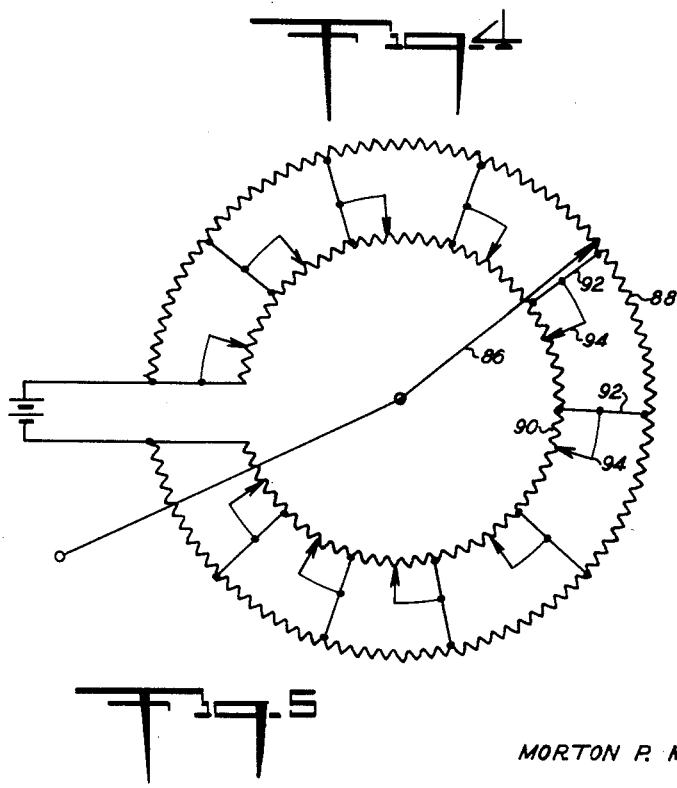

These and other objects will become more readily apparent from a consideration of the following detailed description of the invention taken in conjunction with the accompanying drawings in which:

Fig. 1 is a diagrammatic top plan view of a potentiometer constructed according to the invention, Fig. 2 is a fragmentary plan view of the potentiometer, Fig. 3 is a cross-sectional view taken along lines 3—3 of Fig. 1, Fig. 4 is a circuit diagram of a preferred form of the invention, Fig. 5 is a circuit diagram of an alternative form of the invention, Fig. 6 is a circuit diagram of still a further alternative form of the invention, Fig. 7 is a cross-sectional view showing an alternative form of resistance material, and Fig. 8 is a circuit diagram of an alternative form of the invention.

To facilitate the comprehension of the mechanical aspects of this invention, the schematic circuit diagram of a sine-cosine-potentiometer shown in Fig. 4 should be considered first. Broadly, the potentiometer of the invention comprises a main or primary resistance 10 engaged by wipers 12 and 14, and connected across a source of voltage 16, the source of voltage being connected to the resistance 10 at terminals 18 and 20 through connectors 22 and 24, respectively. The wipers 12 and 14 are connected to a pair of terminals 26 and 28 through a suitable slip ring arrangement to be described below, the potentiometer further including a terminal 19 and a connection 23 to which ground potential may be applied to provide the points of zero potential in the sine and cosine functions.

Many materials known to the art may be used in forming the primary resistance, such as a film of carbonaceous material, germanium, tellurium or silicon. Assuming the resistor 10 is of the type comprising a thin film of resistance material deposited upon an insulator, it will be recognized that its value over its length may vary beyond precision tolerances from the desired value. For example, if the electrical characteristic of the resistance was to be linear, that is, of uniformly increasing resistance along its length, a curve drawn of its actual characteristic would deviate from an exact straight line. Consequently, it is desirable to be able to adjust the equivalent characteristic of the main resistance so that true linearity may be presented. Similarly, in non-linear function potentiometers, the main resistance characteristic should be adjusted so as to effect true conformity with the sinusoidal, logarithmic, square root, or other desired non-linear function which the potentiometer is to simulate. Moreover, since uniformity of product during mass manufacture is difficult if not impossible to attain, it is desirable to be able to adjust each potentiometer individually after manufacturing in order to ensure uniformity of products.

In accordance with the inventions, the adjustment is effected by using a secondary resistance 30, which is divided into substantially equal segments 30a, 30b, 30c . . . 30n, as shown in Fig. 4, the main resistance 10 being divisable into a corresponding plurality of segments 10a, 10b, 10c . . . 10n, to which the segments of secondary resistance are in effect connected in parallel. Each of segments 30a, 30b, 30c . . . 30n in turn comprises a small rheostat having a wiper 32 by which the amount of resistance in parallel with the respective segment of the main resistance 10 may be varied. The segments of the secondary resistance are preferably formed in such a manner that the quantity of resistance in each segment is roughly proportional to the quantity of resistance in the corresponding segment of the main resistor 10. However, this proportionality is subject to wide variation depending upon such factors as the function desired, the shape of the primary resistor, and so forth.

After the potentiometer has been assembled, it may then be connected to an appropriate indicating device, and each of the secondary resistance wipers adjusted while viewing the electrical resistance characteristic until the desired electrical variable function is duplicated.

With reference now to Figs. 1 to 3, one form of a mechanical structure is shown for generating a sine-cosine output function, the potentiometer including a plate 34 whose upper surface is enclosed by a cover 36 (possibly a transparent plastic) held in position by screws 38, the lower surface of the plate being enclosed by a bottom plate 40 held in place by screws 42. The upper surface of the plate 34 has disposed thereon a thin film of resistance material comprising the main resistor 10, and assuming the thickness of the coating to be substantially uniform, the width of the coating varies around the circumference so as to provide the desired function of voltage output during operation.

The main resistor 10 in the embodiment of Fig. 1 is engaged by a pair of wipers 12 and 14 which are connected by bolts 45 to a disc 47, the disc being mounted by a nut 48 to a spindle 49 which passes through a hole 50 in the center of plate 34. As shown in Fig. 3, the spindle includes a shoulder 51 and is mounted on plate 34 by a pair of ball bearings 52 and 53 which are separated by a bushing 54. On the other hand, wipers 12 and 14 have a pair of brushes 56 and 58 connected thereto which engage a pair of slip rings 60 and 62, respectively, the slip rings being connected to a pair of output terminals 26 and 28 by leads 64 and 66, which lie between the plate 34 and the lower cover 40.

The secondary or trim resistance of the potentiometer may be a thin film of the same material employed in the primary resistance, and may be deposited simultaneously with, and in the same manner as the main resistance, thereby simplifying production and assuring economy in fabrication. From an electrical standpoint the secondary resistance thus provides an inherent matching of thermal and aging characteristics between the primary and secondary resistances, which is essential for maintaining accuracy over a range of temperature and over a period of time.

As shown in Figs. 1 and 2, a substantial portion of each segment of the secondary resistance is circular in shape and is contacted by a short circuiting wiper 32 which is rotatably mounted in the plate 34 by a spindle 70, the other end of each wiper being connected in any suitable manner to a point on the resistance segment, such as points 30a, 30b, 30c . . . 30n in Figs. 1 and 2. One technique which may be employed to provide these connections is to use a small wire 72 connected to the resistance segment at one end thereof and connected at the other end to a washer 74, which is in electrical contact with the associated wiper.

In order to provide a rounded peak or valley for the sine function, the input connections to the main or primary resistance are in the form of a pair of V-conductors 80 which provide a very low impedance connection between the external voltage source and the main resistance. In addition, to maintain the rough proportionality of the resistance of the secondary segments to the shunted segments of the primary resistance, the resistance of adjacent secondary segments is varied. For example, a pair of low resistance conductors 82, 84 connect secondary segment 30a to main resistance segment 10a, while conductors of greater resistance connect segment 30b to segment 10b and so on. Also, as shown in Fig. 1, the secondary segments, beginning at 30a are of gradually increasing resistance.

It should be noted that the sine-cosine potentiometer shown in the drawings is symmetrical about its quadrature axes. It is also to be understood that the circuit and mechanical arrangement of the invention described above may be varied within limits without departing from the scope of the invention, and that alternative arrangements such as shown in Figs. 5 to 8 will become immediately apparent.

With reference now to Fig. 5, there is shown the schematic diagram of a potentiometer, in accordance with the invention, wherein a single wiper 86 is rotatably mounted and contacts a main resistance 88 which is a resistance film shaped generally to provide the desired function. A secondary resistance 90 is shunted across various points of the main resistance by conductors 92, a plurality of wipers 94 being adapted to short out portions of the secondary segments to trim the potentiometer to the desired resistance value. On the other hand, Fig. 6, wherein like reference numerals are used to designate like parts, shows another circuit similar to Fig. 5 except that the secondary resistance is not continuous, but is broken into a plurality of separate secondary resistance elements 96. The effect is exactly the same, however, since the open portion is shorted out by the wiper and it obviously makes no difference, electrically, whether an open circuit or a resistance circuit is being shorted out.

It should be pointed out that in lieu of a resistance film deposited on an insulating disc, the potentiometers of the invention may employ a moldable conducting plastic for its resistance elements. As shown in Fig. 7, the plastic, which is a resistance material, is molded on the surface of a non-conducting plastic or other insulator. The plastic has a substantial thickness as compared to the film, but otherwise the electrical characteristics are the same. In the embodiment shown a main resistance 100 is shunted at intervals with a trimming secondary resistance 102 by metal conductors 104 and the whole mounted on an insulating disc 106. It is also to be understood that the potentiometers of the invention need not employ resistances having the circular form described above, and that it is within the scope of the invention to dispose the resistance film along a straight line and to provide means for moving the wiper or wipers linearly, as shown in Fig. 8.

Regardless of the form of the completed potentiometer, after fabrication it is then connected to a reference device and suitable error indicator so that its function can accurately be determined. Any deviations from the desired function may then be corrected by adjustment of the wipers 32 while watching the indicator. After the potentiometer has been properly adjusted, the secondary resistance wipers may be lacquered over in order to make the setting permanent.

In a general manner, while there has been disclosed in the above description what is deemed to be the most practical and efficient embodiments of the invention, it should be well understood that the invention is not limited to such embodiments as there might be changes made in the arrangement, disposition and form of the parts without departing from the principle of the present invention as comprehended within the scope of the accompanying claims.

I claim:

1. A variable resistance device, comprising an elongated thin film of resistance material deposited on a surface of insulating material to form a main resistance, a length of a thin film of resistance material deposited on a surface of said insulating material to form a secondary resistance, electrical connectors connecting segments of said secondary resistance in parallel with segments of said main resistance, and means for varying selectively the quantity of resistance in each secondary segment whereby the resistance characteristics of the device may be accurately set.

2. A film voltage divider comprising a base of insulating material, an elongated thin film of resistance material deposited on a surface of said material to form a main resistance, a main wiper slidably engaging said main resistance, a length of a thin film of resistance material deposited on said base to form a secondary resistance, electrical connectors connecting segments of said secondary resistance in parallel with segments of said main resistance, and secondary wipers, one associated with each said segment of secondary resistance, for varying the voltage distribution along the main resistance.

3. A film potentiometer according to claim 2, in which said connectors comprise strips of resistance material deposited on said base as a film between said main and secondary resistance.

4. A film potentiometer comprising a base of insulating material, a thin film of resistance material deposited on said base in the shape of at least a portion of a circular ring, said film forming a main resistance, a wiper mounted for rotation about the center of said ring and having one end slidably engaging said main resistance, a length of resistance material deposited as a film on said base and lying around at least a portion of a circle concentric with the circle defined by said ring, said length of resistance material forming a secondary resistance, said secondary resistance being connected at spaced intervals along its length to said main resistance at correspondingly spaced intervals, and means for varying the resistance value of each portion of said secondary resistance between connection points.

5. A film potentiometer comprising a base of insulating material, a thin film of resistance material deposited in a strip on said base to form a main resistance, a wiper mounted on said base and in sliding engagement with said film, a second film of resistance material connected in a strip across at least a portion of said main resistance, and means for varying the amount of said second resistance thereby permitting an accurate setting of the voltage distribution along said portion of the main resistance.

6. A potentiometer comprising a base of insulating material, resistance material formed in a strip on said base to form a main resistance, a wiper mounted on said base and in sliding engagement with said main resistance, a second strip of resistance material formed on said base and connected in parallel across at least a portion of said main resistance, and means for varying the amount of said second resistance in parallel with said position of said main resistance thereby permitting an accurate setting of the voltage distribution along said portion of the main resistance.

7. A voltage divider according to claim 6 in which said strips of material are plastic molded on said base.

8. A voltage dividing resistance according to claim 6, in which said main resistance is disposed in substantially a straight line.

References Cited in the file of this patent

UNITED STATES PATENTS

| | | |
|---|---|---|
| 1,862,487 | Wensley | June 7, 1932 |
| 2,463,384 | Holmqvist | Mar. 1, 1949 |